No. 812,704. PATENTED FEB. 13, 1906.
A. DE VITO.
MACHINE FOR MAKING FLAT MACARONIS.
APPLICATION FILED MAY 4, 1905.

2 SHEETS—SHEET 1.

Witnesses
Wm. G. Bergman
Henry J. Suhrbier

Inventor
Angelo de Vito
By his Attorneys

No. 812,704. PATENTED FEB. 13, 1906.
A. DE VITO.
MACHINE FOR MAKING FLAT MACARONIS.
APPLICATION FILED MAY 4, 1905.

2 SHEETS—SHEET 2.

Witnesses
Wm G. Bergman
Henry J. Suhrbier

Inventor
Angelo de Vito
By his Attorneys

UNITED STATES PATENT OFFICE.

ANGELO DE VITO, OF NEW YORK, N. Y.

MACHINE FOR MAKING FLAT MACARONIS.

No. 812,704.      Specification of Letters Patent.      Patented Feb. 13, 1906.

Application filed May 4, 1905. Serial No. 258,905.

*To all whom it may concern:*

Be it known that I, ANGELO DE VITO, a citizen of the Kingdom of Italy, and a resident of New York, in the borough of Manhattan and State of New York, have invented certain new and useful Improvements in Machines for Making Flat Macaronis, of which the following is a specification.

This invention relates to an improved machine for making macaronis of flat or ribbon shape which are known by the Italians as "house macaronis;" and the object of the invention is to furnish a machine by which the dough can be quickly and uniformly rolled out and then cut into long narrow uniform macaronis.

For this purpose the invention consists of a machine for making flat macaronis which comprises a supporting-frame, a lower roll, an upper spring-actuated cutting-roll provided with equidistantly-arranged cutting-knives, cushion-bearings for said cutting-roll, a hinged frame for holding the bearings so as to hold the roll firmly in position, means for locking or releasing the hinged frame, and pivoted and inclined guide-boards located at both sides of the lower roll for guiding the flat roll or dough to and away from the cutting-roll.

The invention consists, further, of certain details of construction and combination of parts, which will be fully described hereinafter and finally pointed out in the claims.

Figure 1:
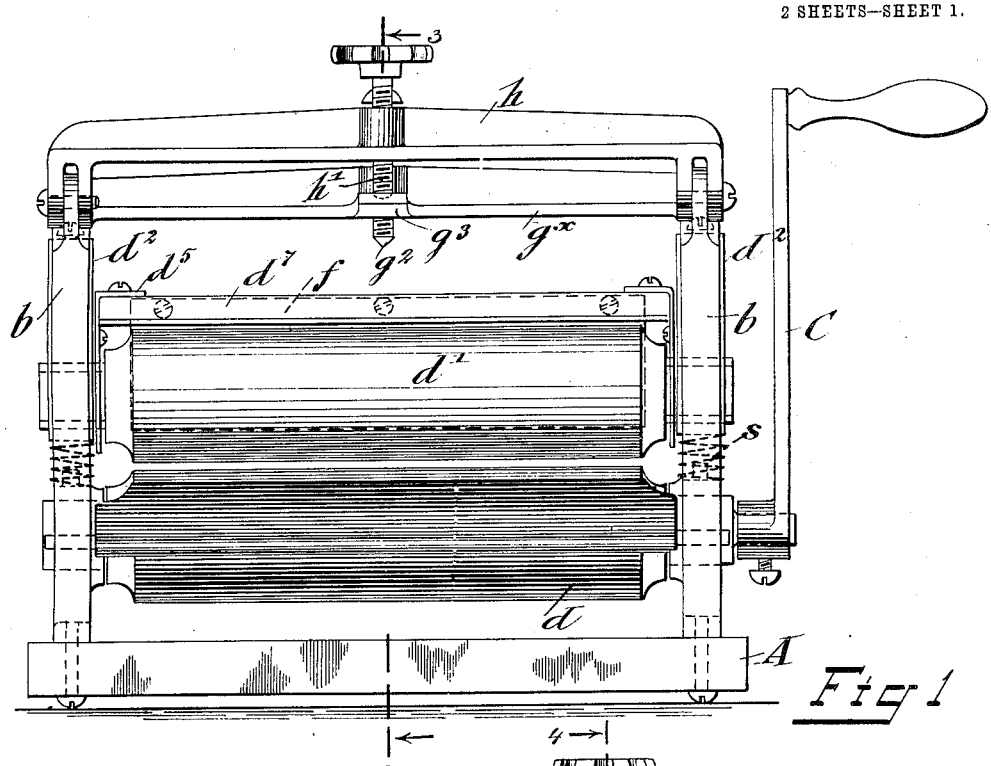
Figure 2:
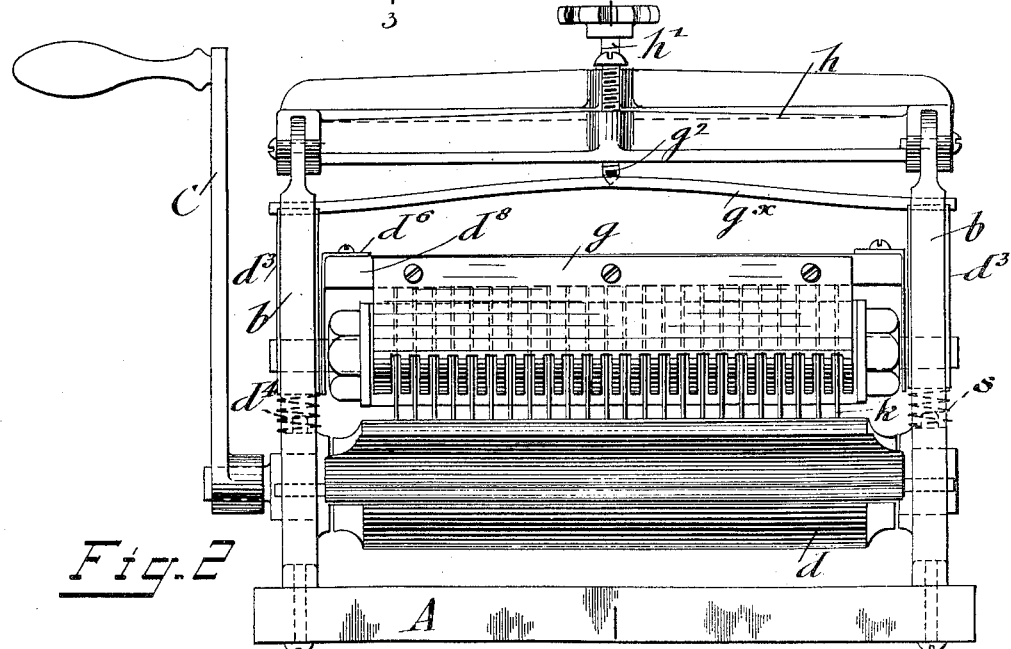
Figure 3:
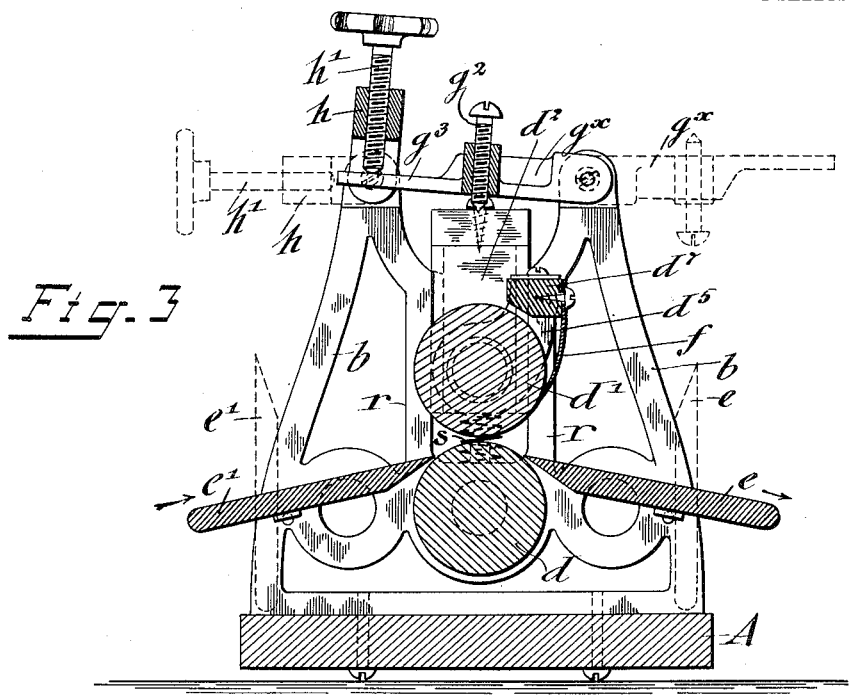
Figure 4:
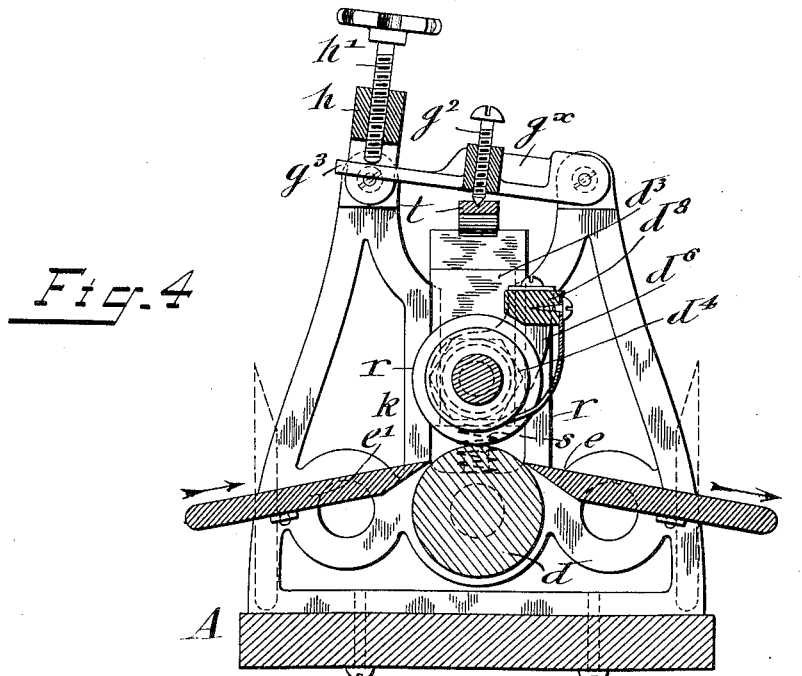

In the accompanying drawings, Figure 1 represents a front elevation of my improved machine for making flat macaronis, showing the same arranged with two presser-rolls for rolling out the dough into a thin sheet. Fig. 2 is a rear elevation of the same machine with a cutting-roll inserted in the place of the upper presser-roll shown in Fig. 1; and Figs. 3 and 4 are vertical transverse sections, respectively, on line 3 3, Fig. 1, and line 4 4, Fig. 2.

Similar letters of reference indicate corresponding parts in the different figures of the drawings.

Referring to the drawings, A represents the base-plate of my improved machine for making flat macaronis.

$b$ $b$ are the upright side standards, which are attached to the base-plate A.

At the center of the supporting side frames $b$ $b$ is supported in suitable bearings a lower roll $d$ and at both sides of the same and fulcrumed to the side frames $b$ $b$ inclined guide-boards $e$ $e'$, which are made tapering at their inner ends adjacent to the roll $d$. The tapered ends of said guide-boards come in contact with the lower roll $d$ at both sides of the same, as shown in Figs. 3 and 4. On swinging the guide-boards $e$ $e'$ on their fulcrums access is given to the lower roll $d$ for conveniently cleaning the same. The side frames are centrally recessed above the bearings for the lower roll, so as to insert journal-blocks $d^2$ of a presser-roll $d'$ or journal-blocks $d^3$ of a cutting-roll $d^4$, the blocks $d^2$ $d^3$ being provided with longitudinal grooves, which are guided on vertical rails $r$ of the side frames, so that the lower ends of the blocks $d^2$ $d^3$ are cushioned by helical springs $s$, which are placed in position on projecting pins of the side frames and the lower ends of the general blocks $d^2$ or $d^3$.

To the ends of the shaft of the presser-roll $d'$ and the cutting-roll $d^4$ are applied brackets $d^5$ $d^6$, respectively, said upwardly-extending brackets supporting at their upper ends transverse bars $d^7$ $d^8$. To the bar $d^7$ is attached a curved clearing-plate $f$, the lower end of which forms contact with the presser-roll, while to the transverse bar $d^8$ is attached a slotted guard-plate $g$, the lower part of which is slotted, so as to permit the entry of the circular cutting-knives $k$ into the lower slotted part of the guard-plate, as shown in Fig. 4.

The journal-blocks $d^2$ of the presser-roll $d'$ or the blocks $d^3$ of the cutting-roll $d^4$ are locked in position by means of a locking-frame $g^\times$, that is pivoted at its ends to the upper ends of the side frames $b$ $b$ and provided with a central adjustable set-screw $g^2$ and a forwardly-extending tongue or heel $g^3$, which is engaged by a U-shaped bail $h$, that is pivoted to the upper ends of the side standards at the opposite side of the journal-blocks, as shown clearly in Figs. 1, 3, and 4. The bail $h$ is provided with a central set-screw $h'$, which is placed over the tongue or heel $g^2$ of the locking-frame $g$, so as to tightly press the same on the upper ends of the blocks $d^2$ or $d^3$ and move them thereby into contact with the lower roll $d$. When the cutting-roll $d^4$ is inserted with its journal-blocks $d^3$ into the side frames $b$ $b$, a transverse spring-bar $t$ is placed over the upper ends of the general blocks, said spring-bar being engaged by the central set-screw $g^2$ on the locking-frame $g$, so that the pressure exerted on the blocks and cutting-roll by the spring-bar can be regulated.

To the shaft of the lower roll $d$ is applied a crank-handle C, by which the lower roll is actuated and turned on its axis. The frictional contact between the lower roll $d$ and the upper presser-rall $d'$ or upper cutting-roll $d^4$ produces the turning of the latter in order to roll out the dough through and between the rolls $d\ d'$ and the cutting of the same in the long narrow strips when the sheet of dough is passed through the roll $d'$ and the cutting-roll $d^4$.

The cutting-roll is constructed of a number of disk-shaped cutting-knives $k$, which are separated equidistantly from each other by intermediate disks or washers of wood, paper, or other suitable material, the ends of the cutting-roll being provided with metallic washers and screw-nuts placed on the ends of the shaft of the cutting-roll and adjusted on the threaded portion of the same, so as to hold the gang of cutting-knives and intermediate washers firmly in position.

My improved machine for making flat macaronis is operated as follows: After the dough is rolled out with a rolling-pin to approximately the width of the machine the presser-roll $d'$, with its journal-blocks $d^2$, is inserted into the central recesses of the side frames $b\ b$ and locked against the tension-spring by the pivoted locking-spring and the central screw of the pivoted bail $h$. After the tension of the cushioning-springs of the journal-blocks is adjusted by means of the set-screw $h'$ the dough is passed over the guide-board $e$ through and between the rolls and opposite guide-board $e'$, being thereby rolled out into a long and thin piece of dough. The presser-roll is then removed by tilting the bail in one direction and the locking-frame in the opposite direction, so that the journal-blocks and the presser-roll can be removed together, and the cutting-roll with its journal-blocks then inserted into the guide-recesses of the side frames, and the spring-bar being then placed in position for the same and the locking-frame, as well as the bail, brought back into position with the set-screw of the locking-frame engaging the center portion of the spring-bar and the set-screw of the bail engaging the heel of the locking-frame. After the tension is properly regulated by the adjustment of the two set-screws the long thin piece of dough is passed over the guide-board $e$ between the lower roll and the cutting-roll and out over the opposite guide-board $e'$, so that the dough is cut into thin long narrow strips, the so-called "flat" or "house" macaronis. The teeth of the guard-plate prevent the adhesion of the strips to the cutting-roll, so that they are fed over the outgoing guide-board, being then ready for use.

For cleaning the rolls the guide-boards can be swung entirely around on their fulcrums, which permits access to the lower rolls, while the cutting and presser rolls may be cleaned by removing them from the supporting side frames.

Having thus described my invention, I claim as new and desire to secure by Letters Patent—

1. In a machine for making flat macaronis, the combination, with supporting side frames, of a lower roll, an upper roll, detachable journal-blocks for supporting the upper roll, a guard-plate supported on the journal-blocks alongside of the upper roll, a pivoted locking-frame for the journal-blocks of the upper roll and a pivoted locking-bail for the locking-frame.

2. In a machine for making flat macaronis, the combination, with supporting side frames, of a lower rotating roll, detachable journal-blocks supported in guide-recesses of the side frames, an upper roll supported in bearings of said journal-blocks, fulcrumed guide-boards arranged at each side of the lower roll, a guard-plate supported alongside of the upper roll, a locking-frame pivoted to the upper end of the side frames on one side of the blocks and provided with a central heel and a locking-frame pivoted at the opposite side of the journal-blocks and provided with a central set-screw for engaging the heel of the locking-frame.

3. In a machine for making flat macaronis, the combination, with supporting side frames, of a lower roll supported in journal-bearings of the same, journal-blocks supported between guide-rails of the side frames, a cutting-roll supported in bearings of the journal-blocks, inclined guide-boards fulcrumed at each side of the lower roll, a guard-plate arranged alongside the cutting-roll on the journal-blocks and provided with recesses for the disk-shaped knives of the cutting-roll and means for locking the journal-blocks of the cutting-roll in position.

4. In a machine for making flat macaronis, the combination, with supporting side frames, of a lower rotating roll supported in journal-bearings of the same, journal-blocks supported in guide-rails of the side frames, a cutting-roll supported in bearings of the journal-blocks, inclined guide-boards fulcrumed at each side of the lower roll, a transverse spring-bar extending between the upper faces of the journal-blocks, a locking-frame applied to said spring-bar, and a locking-bail applied to the locking-frame.

In testimony that I claim the foregoing as my invention I have signed my name in presence of two subscribing witnesses.

ANGELO DE VITO.

Witnesses:
PAUL GOEPEL,
HENRY J. SUHRBIER.